(12) United States Patent
Lassa et al.

(10) Patent No.: US 8,135,944 B2
(45) Date of Patent: *Mar. 13, 2012

(54) SELECTIVELY POWERED DATA INTERFACES

(75) Inventors: Paul Lassa, Mountain View, CA (US); Paul Paternoster, Los Altos, CA (US); Po-Shen Lai, San Jose, CA (US); Yongliang Wang, Saratoga, CA (US)

(73) Assignee: SanDisk Technologies Inc., Plano, TX (US)

( * ) Notice: Subject to any disclaimer, the term of this patent is extended or adjusted under 35 U.S.C. 154(b) by 1147 days.

This patent is subject to a terminal disclaimer.

(21) Appl. No.: 11/686,350

(22) Filed: Mar. 14, 2007

(65) Prior Publication Data

US 2008/0229121 A1    Sep. 18, 2008

(51) Int. Cl.
*H01R 24/00* (2006.01)
(52) U.S. Cl. ............... 713/1; 713/2; 713/100; 439/930; 439/945; 710/62; 361/737
(58) Field of Classification Search .......... 713/1, 2, 713/100; 439/930, 945; 710/62; 361/737
See application file for complete search history.

(56) References Cited

U.S. PATENT DOCUMENTS

| | | | |
|---|---|---|---|
| 5,757,203 A | 5/1998 | Brown | |
| 6,434,648 B1 * | 8/2002 | Assour et al. | 710/305 |
| 7,039,820 B2 | 5/2006 | Armstrong | |
| 7,051,306 B2 | 5/2006 | Hoberman | |
| 7,080,341 B2 | 7/2006 | Eisenstadt | |
| 7,127,560 B2 | 10/2006 | Cohen | |
| 7,381,096 B2 * | 6/2008 | Alejandro et al. | 439/638 |
| 7,614,916 B2 * | 11/2009 | Jow | 439/630 |
| 2001/0010476 A1 | 8/2001 | Weng | |
| 2003/0120987 A1 | 6/2003 | Savaria | |
| 2003/0204757 A1 | 10/2003 | Flynn | |
| 2003/0208633 A1 | 11/2003 | Rimmer | |
| 2004/0117678 A1 | 6/2004 | Soltis | |
| 2004/0158750 A1 | 8/2004 | Syed | |
| 2005/0036397 A1 * | 2/2005 | Yeh et al. | 365/232 |
| 2005/0149799 A1 | 7/2005 | Hemia | |
| 2005/0253462 A1 | 11/2005 | Falkowski | |

(Continued)

OTHER PUBLICATIONS

U.S. Appl. No. 11/965,943 entitled, "Systems and Circuits with Multirange and Localized Detection of Valid Power", filed Dec. 28, 2007, 51 pages.

(Continued)

*Primary Examiner* — M Elamin
(74) *Attorney, Agent, or Firm* — Brinks Hofer Gilson & Lione

(57) ABSTRACT

A plurality of separately powered data interface circuits, a controller circuit, and power switch circuits that collectively enable a supply of power to only one of the data interface circuits and disable the supply of power to the other data interface circuits. Alternatively, the separately powered circuits need not be data interface circuits.

50 Claims, 1 Drawing Sheet

U.S. PATENT DOCUMENTS

| | | |
|---|---|---|
| 2006/0076977 A1 | 4/2006 | Zhu |
| 2006/0107077 A1 | 5/2006 | Roth |
| 2006/0112197 A1* | 5/2006 | Yao ................................ 710/15 |
| 2006/0184808 A1 | 8/2006 | Chua-Eoan |
| 2008/0159157 A1 | 7/2008 | Nair |
| 2008/0162737 A1 | 7/2008 | Liu et al. |
| 2008/0162753 A1 | 7/2008 | Liu et al. |
| 2008/0162954 A1 | 7/2008 | Lassa et al. |
| 2008/0162957 A1 | 7/2008 | Lassa et al. |
| 2008/0163012 A1 | 7/2008 | Nair |
| 2008/0211570 A1 | 9/2008 | Wang et al. |
| 2008/0233792 A1* | 9/2008 | Alejandro et al. ............ 439/489 |
| 2008/0237647 A1 | 10/2008 | Cheung et al. |
| 2008/0238555 A1 | 10/2008 | Chapski et al. |
| 2008/0297961 A1 | 12/2008 | Jin et al. |

OTHER PUBLICATIONS

Office Action issued Dec. 8, 2009 in U.S. Appl. No. 11/649,325 (5 pgs).

Office Action issued Dec. 7, 2009 in U.S. Appl. No. 11/649,326 (5 pgs).

Shi, K.; "Dual threshold voltages and power-gating design flows offer good results"; EDN; Feb. 2, 2006; pp. 65, 66, 68, 70; USA.

* cited by examiner

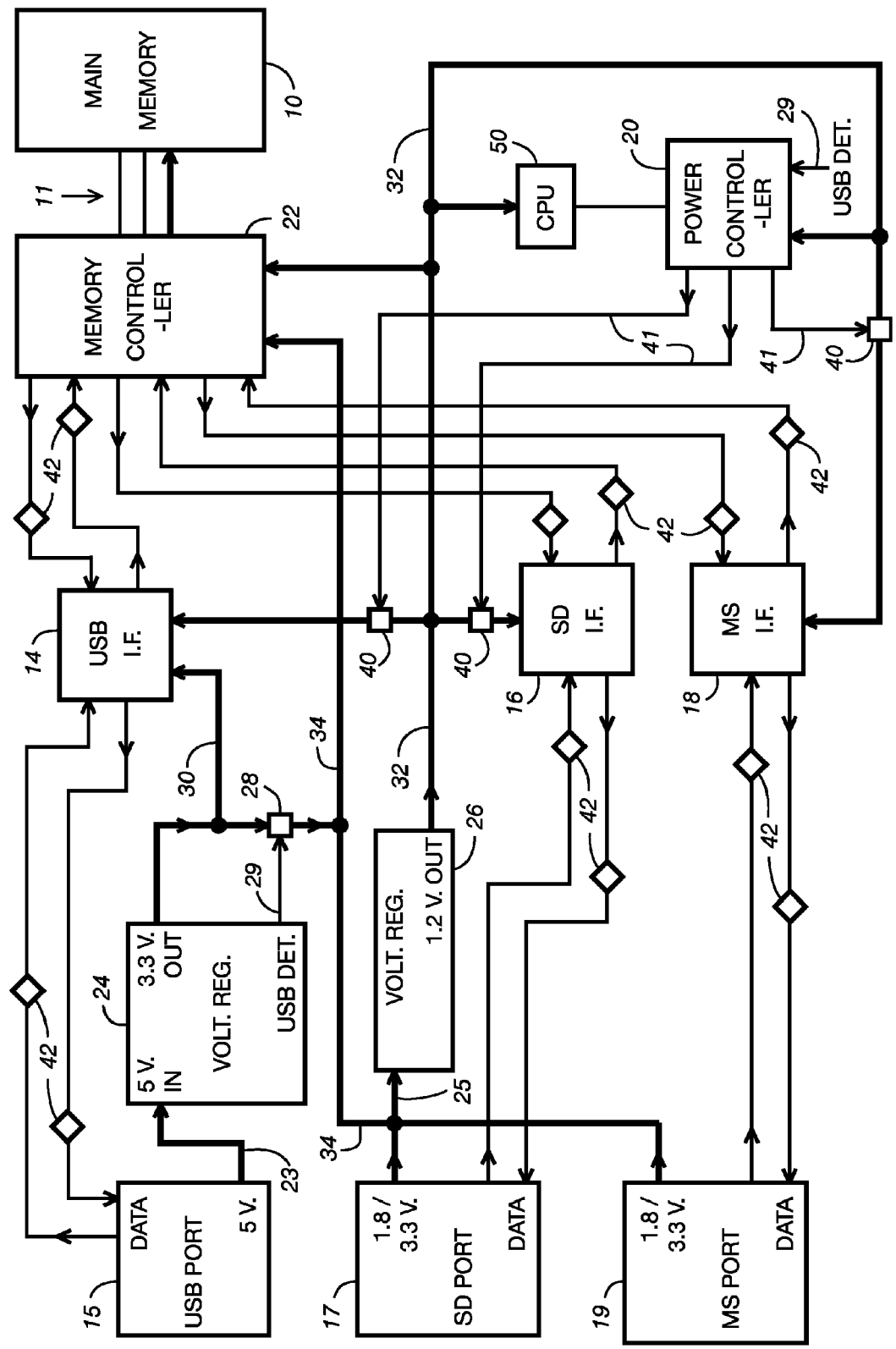

US 8,135,944 B2

SELECTIVELY POWERED DATA INTERFACES

The present application is a continuation-in-part application of U.S. patent application Ser. No. 11/649,325, filed on Dec. 31, 2006 and is a continuation-in-part of U.S. patent application Ser. No. 11/649,326, filed on Dec. 31, 2006.

FIELD OF THE INVENTION

The invention relates generally to electrical devices having a plurality of separately powered data interface circuits. More specifically, the invention relates to reducing power consumption of such devices by disabling the supply of power to all but one of the data interface circuits.

BACKGROUND OF THE INVENTION

The physical connector through which an electrical device communicates data with another device is referred to as an "interface port", or simply "port". Two compatible devices can communicate by connecting together their respective ports, either directly or through an electrical cable.

In order for two devices to communicate data, they typically must employ a common data interface protocol, also referred to as a communications protocol. Examples of industry-standard data interface protocols are USB (Universal Serial Bus), MS (Memory Stick), SD (Secure Digital), MMC (Multi-Media Card), and CF (Compact Flash). These protocols are commonly used by computers, digital cameras, digital music players, mobile telephones and video games.

When two devices are communicating, if one device controls the communication, the controlling device is referred to as a "host", and the other device is referred to as a "peripheral device". Peripheral devices, especially portable peripheral devices, often receive their operating power from a host device through the interface port rather than having their own independent source of operating power such as a battery.

A "data interface circuit" within a device is responsible for implementing a specific data interface protocol for transferring data between some circuitry within the device and a port, where the port is intended to be connected to another device capable of communicating in accordance with that protocol. In a peripheral device, a data interface circuit also is referred to as a "host interface circuit". Electrical devices commonly include a plurality of data interface circuits that implement different data interface protocols to enable communication with other devices that employ any of these protocols.

Most of the industry-standard data interface protocols require a physical port that is unique to that protocol, so that the port required by one data interface protocol usually is incompatible with the port required by any other protocol. To achieve physical compactness, portable devices, such as portable non-volatile memory devices, typically include only one or two physical ports, and hence are compatible with only one or two corresponding data interface protocols. Therefore, if a manufacturer of such portable devices wants to offer products compatible with different industry-standard data interface protocols, the manufacturer typically offers a different model of portable device for each type of data interface protocol.

SUMMARY OF THE INVENTION

The invention enables an electrical apparatus to include a plurality of data interface circuits and ports without consuming more power than an apparatus that includes only a single data interface circuit.

A first aspect of the invention is an apparatus, such as a peripheral device, having a plurality of separately powered data interface circuits that are adapted to communicate with an electrical device external to the apparatus. The apparatus includes a controller circuit and power switch circuits that collectively enable a supply of power to only one of the data interface circuits and disable the supply of power to the other data interface circuits.

The invention advantageously reduces power consumption by disabling power to all but one data interface circuit. Minimizing power consumption is especially beneficial for peripheral devices that derive their operating power from an external host device and for portable, battery-powered peripheral devices.

In a preferred embodiment, the controller circuit selects which one data interface circuit to enable in response to the apparatus receiving power from an external host device. Preferably the controller circuit does not enable power to any other data interface circuit so long as the apparatus continues to receive power from the external host device.

In a broader aspect of the invention, the separately powered circuits need not be data interface circuits, but can be any separately powered electrical circuits that are not used concurrently. The invention advantageously reduces power consumption by disabling power to all but one of the separately powered circuits.

In a preferred embodiment, the invention can be implemented on a single integrated circuit that is packaged as part of a peripheral device. In that case, even if the peripheral device includes only one port, and even if that port is incompatible with one or more of the host interface circuits, the invention is advantageous because it permits a single integrated circuit to include a plurality of host interface circuits without consuming any more power than if it included only a single host interface circuit. Such an integrated circuit can be mounted in different packages that are connected to different ones of the host interface circuits. Accordingly, a single integrated circuit design can be incorporated in a variety of products, advantageously achieving greater economy of scale and avoiding the need to design and inventory multiple integrated circuits for use in multiple products.

An additional advantage of this embodiment is that including multiple host interfaces on one integrated circuit increases the probability that at least one of the host interfaces will not suffer a defect during manufacturing. If one host interface is defective but another host interface is good, the integrated circuit can be packaged in a product designed to use only the good interface, thereby avoiding the need to discard the partially defective integrated circuit and hence increasing manufacturing yield.

The invention further includes method counterparts of each of the apparatus aspects summarized above.

BRIEF DESCRIPTION OF THE DRAWINGS

FIG. 1 is a block diagram of a preferred embodiment of the invention. Power buses are drawn with heavier lines than data or control signal lines. Conductor lines that cross each other in the drawing are not connected together unless a large dot is shown where the lines cross.

DETAILED DESCRIPTION OF THE PREFERRED EMBODIMENTS

FIG. 1 is a block diagram of a preferred embodiment of the apparatus of the invention, which in this embodiment is a type of portable peripheral device that supplies portable, removable memory to a host device. Such a portable memory device is commonly known as a non-volatile memory (NVM) device, also referred to as an NVM drive or NVM card.

The portable NVM device shown in FIG. 1 includes at least two integrated circuits: at least one main memory (non-volatile flash memory) integrated circuit 10 and a combination interface and controller integrated circuit 12, hereinafter referred to as the combination integrated circuit 12. The combination integrated circuit 12 in the exemplary embodiment includes three separately powered host interface circuits 14, 16, 18, a power controller circuit 20, a memory controller circuit 22, a 3.3 volt voltage regulator 24, and a 1.2 volt voltage regulator 26. More specifically, the combination integrated circuit 12 includes all the elements shown in FIG. 1 except for the main memory 10, conductors 11, and ports 15, 17, 19.

The two integrated circuits 10, 12 are connected by conductors 11. The conductors 11 can be conductors on a printed wiring board on which the integrated circuits are mounted. Alternatively, if the two integrated circuits are stacked within a package, the conductors 11 can be substrate conductors or bond wires between the two integrated circuits 10, 12.

In a general aspect, the invention can be incorporated in any apparatus having a plurality of separately powered electrical circuits. The invention enables such apparatus to reduce its power consumption by supplying operating power to only one of the separately powered circuits at any given time. By "separately powered", we mean that a supply of operating power can be selectively enabled or disabled to each of the separately powered circuits.

In a more specific aspect of the invention, each of the separately powered electrical circuits is a data interface circuit for data communications with a second device that is external to the device of the invention. We use the term "data communications" to mean sending data to the external device, receiving data from the external device, or both. The NVM device of FIG. 1 includes three separately powered data interface circuits 14, 16, 18.

The NVM device of FIG. 1 is a peripheral device because it relies on a host device to control communications with the NVM device. As explained in the Background of the Invention, the data interface circuits of a peripheral device are more specifically referred to as host interface circuits. In addition, the exemplary NVM device of FIG. 1 receives its operating power from the host device to which it is connected. Examples of a host device to which a portable NVM device or other peripheral device can be connected are a computer, a digital camera, a portable music player, a mobile telephone, or a video game console.

Each separately powered host interface circuit 14, 16, 18 implements a different data interface protocol. Including different host interface circuits enables a peripheral device to connect to different host devices that employ different data interface protocols.

For purposes of this patent specification, we use the term "port" to mean a physical connector through which a device can communicate data with another device in accordance with a data interface protocol. Different data interface protocols often require different ports. Each port is connected to one or more host interface circuits, each of which implements a data interface protocol compatible with that port.

In the exemplary portable NVM device, the three host interface circuits are a USB host interface circuit 14, an SD host interface circuit 16, and an MS host interface circuit 18. The industry standards for the USB, SD and MS data interface protocols require different ports, shown in FIG. 1 as USB port 15, SD port 17, and MS port 19. Although all three host interface circuits are included in the combination integrated circuit 12, the portable NVM device typically does not include all three of the ports shown in FIG. 1, but instead only includes ports for one or two of these three data interface protocols (USB, SD and MS). The portable NVM device is capable of data communications employing only those data interface protocols for which it has both a corresponding data interface circuit and a compatible port.

In general, each of the separately powered electrical circuits of the invention receives its operating power from one or more power sources. Examples of a power source include an internal or external battery, a connection to AC power mains, or a connection to a port through which a host device supplies operating power to the apparatus of the invention. As used in this patent specification, the term "power source" also includes voltage regulators, power buses, and any other electrical components in the electrical path through which operating power is supplied to the separately powered electrical circuits of the invention.

According to the industry standard specifications for USB, SD and MS interfaces, a host device provides 5 volt operating power through a USB port 15 and either 3.3 volt or 1.8 volt operating power through an SD port 17 or MS port 19. The exemplary portable NVM device of FIG. 1 is designed to derive its operating power from any of these three voltages that may be supplied by a host device.

The combination integrated circuit 16 includes a 3.3 volt bus 30 (used only when receiving power from a USB host), a 1.2 volt bus 32, and a 1.8/3.3 volt bus 34. As will be explained below, a power switch 28 is connected between the 3.3 volt bus 30 and the 1.8/3.3 volt bus 34. The power switch 28 is closed when the 3.3 volt regulator 24 receives 5 volt power from a USB port 15, and it is open otherwise.

The USB host interface circuit 14 receives power from two power sources: the 3.3 volt bus 30 and the 1.2 volt bus 32. The SD and MS host interface circuits 16, 18, the power controller 20, and the CPU 50 (described below) receive power from the 1.2 volt bus 32. The memory controller 22 receives power from both the 1.2 volt bus 32 and the 1.8/3.3 volt bus 34. The memory controller uses the 1.2 volt supply for most of its internal logic and uses the 1.8/3.3 volt supply to interface with main memory integrated circuits 10 that require either a 3.3 volt or 1.8 volt power supply.

If the portable NVM device includes a USB port 15, the 5 volt power pin on the USB port is connected to the power input 23 of the 3.3 volt voltage regulator 24. When the portable NVM device is connected to a USB host, the 3.3 volt voltage regulator 24 receives 5 volt power from the USB host and outputs 3.3 volts to the 3.3 volt bus 30, which powers the USB interface circuit.

When the input 23 of the 3.3 volt voltage regulator 24 receives 5 volt power from a USB host, the 3.3 volt regulator 24 sends a "USB Detect" signal 29 to power switch 28, in response to which the power switch 28 closes so as to couple the 3.3 volt output of the 3.3 volt regulator to the 1.8/3.3 volt bus 34 which powers the memory controller circuit 22 and the 1.2 volt voltage regulator 26. The voltage regulator 26 outputs 1.2 volts to the 1.2 volt bus 32.

If the portable NVM device includes an SD port 17, an MS port 19, or both, the power pins of the SD and MS ports are connected to the power input 25 of the 1.2 volt voltage regulator 26 and to the 1.8/3.3 volt bus 34. When the portable NVM device is connected to a host through the SD or MS port, the 1.2 volt voltage regulator 26 receives 3.3 volt or 1.8 volt power from the host and couples this power to the 3.3/1.8 volt bus 34, which is connected to the memory controller circuit 22. The 1.2 volt voltage regulator also outputs 1.2 volts to the 1.2 volt bus 32.

While the NVM device is connected to an SD or MS port, the 3.3 volt regulator 24 will not receive power at its 5 volt input, hence it does not turn on the USB Detect signal 29. The USB Detect signal being off causes switch 28 to remain open, its default state, thereby disconnecting the 3.3/1.8 volt bus 34 from the output of the 3.3 volt regulator 24.

In summary, the power sources for the three host interface circuits include the three ports 15, 17, 19; the two voltage regulators 24, 26; the power switch 28; and the power buses 30, 32.

In an integrated circuit, a power island (also conventionally called a power domain) is a section of the integrated circuit to which the supply of operating power can be selectively enabled or disabled independently of other power islands on the integrated circuit. Conventional power islands are disclosed in the following US patents and patent applications, the entire content of which is hereby incorporated by reference into this patent specification: U.S. Pat. No. 7,051,306 issued May 23, 2006 to Hoberman, U.S. Pat. No. 7,080,341 issued Jul. 18, 2006 to Eisenstadt, US patent application publication 20010010476 by Weng published Aug. 2, 2001, US patent application publication 20030204757 by Flynn published Oct. 30, 2003, US patent application publication 20040158750A1 by Syed published Aug. 12, 2004, US patent application publication 20050253462 by Falkowski published Nov. 17, 2005, and US patent application publication 20060076977A1 by Zhu published Apr. 13, 2006.

A feature of the preferred embodiment of the invention is that each of the three host interface circuits 14, 16, 18 is fabricated in a distinct power island on the integrated circuit 12. The power controller circuit 20 and the other circuitry of the portable NVM device, including memory controller circuit 22, are fabricated in one or more power islands distinct from the power islands of the three host interface circuits. This means the supply of power from the 1.2 volt power bus 32 to each of the three host interface circuits can be selectively enabled or disabled independently of the other host interface circuits and independently of the other circuitry 22 on the integrated circuit 12. However, the power controller circuit 20 should never be disabled from receiving power, except possibly in testing during manufacture of the integrated circuit 12.

Power controller 20 controls which of the power islands receive power from the 1.2 volt power bus 32 by controlling a plurality of power switch circuits 40. A power switch circuit 40 is interposed between each host interface circuit 14, 16, 18 and the one or more power buses from which the host interface circuit receives power. Each power switch circuit is connected to supply power to only one of the host interface circuits, so that the supply of power can be enabled and disabled to each host interface circuit independently of the other host interface circuits and independently of the other circuitry 22 of the integrated circuit 12. If a host interface circuit receives power from two or more power buses, a distinct power switch circuit is interposed between that host interface circuit and each of the power buses from which it receives power.

As stated above, the circuitry of the integrated circuit 12 outside the host interface circuits optionally may be fabricated in an additional plurality of power islands, in which case these additional power islands would be controlled by additional power switch circuits. The additional power switch circuits can be distinguished from those connected to the host interface circuits by referring to the latter as host interface power switch circuits.

Each host interface power switch circuit 40 has a power input, a power output, and a control input 41. The power input is connected to one of the power buses to receive power from the power source that supplies power to that bus. The power output is connected to supply power to only one of the host interface circuits.

The control input 41 of each host interface power switch circuit 40 is connected to receive from the power controller 20 a control signal that can be either an enable signal or a disable signal. The power switch circuit either connects or disconnects the flow of power from its power input to its power output in response to whether the control input receives the enable signal or the disable signal, respectively. Preferably the enable and disable signals are two respective binary logic values of a control signal produced by the power controller such that one value is a logical zero and the other is a logical one.

A valuable feature of the invention is that, during normal operation of the portable NVM device, the power controller 20 selects one of the host interface circuits to receive power and disables power to the other host interface circuits. We refer to the selected host interface circuit as the "activated" host interface circuit. Specifically, the power controller sends an enable signal to the control input of each of the host interface power switches 40 connected to the activated host interface circuit, and it sends a disable signal to the control input of each of the other host interface power switches 40.

Disabling power to the host interface circuits other than the one activated host interface circuit enables the portable NVM device to/reduce its power consumption to the same level as if it had only one host interface circuit. This is important because host devices generally can supply only a limited amount of power to peripheral devices connected to their interface ports. As explained near the end of this patent specification, reducing power consumption also is important for devices, such as battery-powered portable devices, that do not receive their operating power from a host device.

If the portable NVM device has multiple ports, the power controller can detect which port is connected to a host device by detecting which port is receiving power. In a preferred aspect of the invention, the power controller 20 activates one of the host interface circuits shortly after the portable NVM device initially is connected to a host device and receives power from the host device.

To detect which port of the NVM device is receiving power, the power controller preferably includes one or more inputs respectively connected either to the power pin of one or more of the respective ports or else to the respective power sources (such as voltage regulators 24, 26) that receive power from one or more of the respective ports. When the power controller detects a signal at one of these inputs, the power controller determines that the port associated with that input is receiving power from a host and therefore determines that the data interface circuit connected to that port should be activated. These inputs may be referred to as "port detection inputs" or "power detection inputs".

The power controller preferably determines which data interface circuit should be activated, as described in the preceding paragraph, as part of a hardware Power-On Reset (POR) process that is initiated as soon as the portable NVM device receives power from a host device after a period of not receiving power. In a preferred hardware implementation, the hardware POR process is performed by a hardware logic circuit, referred to as the POR circuit, within the power controller. The POR circuit includes the port detection inputs described in the preceding paragraph.

For example, one preferred commercial embodiment of the invention is a portable NVM device having only two ports, a USB port 15 and an SD port 17. As soon as either the USB port or the SD port is connected to a host, the 1.2 volt voltage regulator 26 supplies operating power to the power controller 20 as described above. A Power-On Reset (POR) hardware logic circuit within the power controller responds to the initiation of operating power by initiating a POR process within the POR circuit.

If the 3.3 volt voltage regulator 24 receives 5 volt power from the USB port, it outputs a USB Detect signal 29, as described above. The POR circuit within the power controller 20 has an input connected to receive the USB Detect signal 29 from the 3.3 volt voltage regulator 24. If the USB Detect signal is present (i.e., "on") when the POR circuit initiates the POR process, the POR circuit determines that the USB host interface circuit should be activated. Conversely, if the USB Detect signal is absent (i.e., "off"), the POR circuit determines that the SD host interface circuit should be activated.

After determining which host interface circuit should be activated, the power controller stores a value that identifies the activated host interface circuit. It stores this identification (ID) value in a logic circuit within the power controller that is referred to herein as the "Interface ID logic circuit" or simply the "ID logic circuit", The Interface ID logic circuit can be a state machine including one or more flip-flops, where the respective states of the flip-flops collectively represent which host interface circuit is activated. More preferably, the Interface ID logic circuit is a register in which the power controller stores said value. The combination integrated circuit 12 preferably includes a programmable processor (CPU) 50 that can read the value stored in the register to determine which host interface circuit is activated and then perform different software or firmware programs as a function of which host interface circuit is activated. (For the purpose of this patent specification, the terms software and firmware are considered equivalent and are used interchangeably.)

After the power controller stores a value in the Interface ID logic circuit that identifies which host interface circuit is activated, the power controller preferably continues the hardware Power-On Reset process by enabling power to the activated host interface circuit and disabling power to the other host interface circuits. As described above, this is accomplished by the power controller sending control signals to the power switch circuits 40.

After the power controller completes its hardware Power-On Reset process sequence, it preferably commands the programmable processor 50 to begin executing a software Power-On Reset process sequence. The command can be, for example, in the form of the power controller setting a flag in the Interface ID logic circuit or sending a separate Power-On Reset electrical control signal to the programmable processor. As stated above, the software in the programmable processor preferably reads the value stored in the Interface ID logic circuit to determine which host interface circuit has been activated by the power controller. The software preferably performs different functions depending on which host interface circuit is activated. The software Power-On Reset sequence preferably is initiated by software stored in a read-only memory, referred to as the Boot ROM, that is connected to the programmable processor.

As stated above, which host interface circuit is identified as "activated" by the Interface ID logic circuit controls the selection of the power switch circuits 40 to which the power controller sends "enable" and "disable" control signals. Therefore, the identification by the Interface ID logic circuit of which host interface circuit is activated effectively determines the state of a hardware state machine within the power controller. Likewise, the Interface ID logic circuit determines the state of a software state machine in the programmable processor 50, because the software performs different functions depending on which host interface circuit is activated.

We refer to the power controller as being characterized by a plurality of "activation states", with each activation state being associated with a respective host interface circuit. When the power controller activates (enables power to) one of the host interface circuits in response to that host interface being identified by the Interface ID logic circuit, the power controller is said to be operating in a corresponding one of the activation states.

In a preferred aspect of the invention, throughout the time period beginning when the power controller enters a host interface activation state as just described, and continuing as long as the portable NVM device continues to receive power from the host device without interruption, the power controller does not change which host interface circuit is activated and powered, and the power controller continues to disable power to the other host interface circuits. This continuous disabling of the other host interface circuits has the advantage of minimizing power consumption by the portable NVM device. In contrast, conventional implementations of power islands in integrated circuits generally reduce or disable power to selected power islands only temporarily, depending on the activity currently being performed by the integrated circuit.

The reason it is feasible for the power controller to not change which host interface circuit is activated so long as the portable NVM device continues to receive power is that a portable NVM device, even if it has multiple ports, typically is capable of connecting only one port at a time to a host device. To connect a different port of the portable NVM device to a host device, the portable NVM device would have to be physically removed from the port on the host device and then physically reinserted to a different port. Removing the portable NVM device from the port on the host device interrupts the power being provided by the host device to the portable NVM device. The power controller can operate on the assumption that the port through which the portable NVM device initially receives power, as described above, is the only port through which the portable NVM device can communicate as long as that port remains connected to a host device, that is, as long as the portable NVM device continues without interruption to receive power through that port.

When power is interrupted through the active port, all circuits in the portable NVM device lose power. When power subsequently is received through one of the ports, the power controller repeats the Power-On Reset sequence described above by identifying which port is receiving power and then activating the host interface circuit associated with that port.

Because the portable NVM device typically cannot be connected to a different host through a different port without first interrupting power, preferably it should not be possible to modify the value stored in the Interface ID logic circuit after it is initially established by the power controller during the Power-On Reset process. For example, if the Interface ID logic circuit includes a register from which the programmable processor can read such value, the programmable processor should not be permitted to modify such value in the register. An exception is described near the end of this patent specification in the discussion of alternative embodiments.

Each clock input, data input, and data output of each host interface circuit that is connected to circuits outside the power island of the host interface circuit preferably is connected through an isolator circuit 42, as shown in FIG. 1. Each isolator circuit is a gate or latch having a first input, a second input and an output that constitute the control input, data input and data output, respectively, of the isolator circuit. The gate or latch selectively couples the data input to the data output in response to the control input, as described below. The control input of the isolator circuit is connected to receive a control signal from the power controller. Conventional isolators connected to power islands are disclosed in the US patents and patent applications identified above as disclosing conventional power islands.

(As stated in the preceding paragraph, for each of the isolator circuits 42, there is a conductor connecting its control input to the power controller 20. However, FIG. 1 does not show the control inputs of the isolator circuits or the conductors connecting them to the power controller because showing them would make the drawing too crowded.)

When the power controller activates a given host interface circuit (by enabling the power switches that supply operating power to that host interface circuit, as described earlier), the power controller additionally sends an "isolator enable" control signal to the control input of each isolator circuit connected to that host interface circuit, which causes each isolator circuit to close the connection between its data input and its data output. Conversely, when the power controller disables the supply of operating power to a given host interface circuit, the power controller additionally sends an "isolator disable" control signal to the control input of each isolator circuit connected to that host interface circuit.

The isolators connected to the clock inputs and data inputs of the host interface circuit, referred to as input isolators, preferably are configured to output a zero voltage signal to the host interface circuit in response to the "isolator disable" control signal, thereby minimizing any power consumption by the host interface circuit while it is disabled on account of signals at such inputs.

For example, each input isolator can be implemented as a 2-input NOR gate. An output of the NOR gate constitutes the data output of the input isolator, and it is connected to a clock or data input of the host interface circuit. An inverted input of the NOR gate constitutes the data input of the input isolator, and it is connected to receive the clock or data signal that normally would be connected to the aforesaid input of the host interface circuit. A non-inverted input of the NOR gate constitutes the control input of the input isolator. When the control input receives a logic 0 control signal, signifying "isolator enable", the clock or data signal is transferred through the NOR gate. When the control input receives a logic 1 control signal, signifying "isolator disable", the output of the input isolator is held at logic 0, regardless of the value of the clock or data signal.

Equivalently, each input isolator can be implemented as a 2-input AND gate whose output constitutes the data output of the input isolator and whose two inputs constitute the control input and data input, respectively, of the input isolator. In this implementation, the control input would be logic 1 for "isolator enable" and logic 0 for "isolator disable".

The isolators connected to the data outputs of the host interface circuit, referred to as the output isolators, preferably are configured to respond to the disable control signal by either latching the last value of the data input before arrival of the disable control signal, or by outputting a logic 0 or 1, whichever will avoid any adverse affects on the logic of the other circuit receiving the data output.

The previous description states that power should not be enabled simultaneously for more than one data interface circuit. That is true for normal use of the apparatus. However, for testing the apparatus during manufacture, the power controller circuit may be capable of entering additional states of operation such as a diagnostic state in which all interface circuits are on and an off state in which all interface circuits are off. Preferably, entering such additional states should require access to pads within the integrated circuit 12 that are not accessible to the user after the integrated circuit has been mounted in the package sold to consumers. Therefore, the power controller can be described as having states of operation that include, but are not limited to, the activation states described earlier and the additional states described in this paragraph.

The invention is not limited to the separately powered circuits being data interface circuits; they can be any separately powered electrical circuits that are not used concurrently. The invention advantageously reduces power consumption by disabling power to all but one of the separately powered circuits. For example, in the exemplary NVM device, one of the separately powered circuits can be an encryption circuit that is activated (i.e., powered) only when the NVM device is connected to a host device through its Secure Digital (SD) port. The encryption circuit preferably is not activated when the NVM device is connected to a host device through one of the other ports, because the interface protocols associated with those ports do not encompass data encryption.

Although a portable NVM device has been described as an example of the invention, the preceding description of the invention also applies to any peripheral device that has a plurality of separately powered data interface circuits and that receives electrical power from, and communicates data with, a host electrical device external to the apparatus. Reducing the power consumption of a peripheral device is important because host devices generally can supply only a limited amount of power to peripheral devices connected to their interface ports.

Furthermore, the invention also applies to any electrical apparatus that has a plurality of separately powered data interface circuits even if the apparatus has its own power supply rather than receiving operating power from an external host. In that case, instead of detecting which port receives power, the power controller can be configured to activate one of the data interface circuits (e.g., by selecting one of the interface activation states of the power controller) in response to a value stored in the Interface Logic ID circuit. If the Interface Logic ID circuit includes a register that is accessible by a programmable processor 50, the software executed by the programmable processor can be permitted to modify the values stored in the register, in contrast with the previously discussed embodiments in which the processor was permitted only to read the register values.

Activating only one data interface circuit and disabling power to the other data interface circuits enables the apparatus to reduce its power consumption to the same level as if it had only one data interface circuit. If the apparatus is a battery-powered portable device, reducing power consumption is especially valuable in order to maximize battery life.

A further alternative embodiment of the invention is an electrical apparatus that has only one port, but that includes a plurality of separately powered data interface circuits. An example of such apparatus would be portable NVM device including a combination integrated circuit 12 with separately powered USB, SD and MS interface circuits as described above. A vendor could install the same integrated circuit in three different portable NVM products: a first product that only has a USB port, a second product that only has an SD port, and a third product that only has an MS port. The vendor could benefit from economies of scale, reduction of inventory logistics risks, and improved efficiency of supply chain management by manufacturing a single combination integrated circuit 12 for all three products instead of manufacturing three different integrated circuits with the three respective host interface circuits.

For such an apparatus that has only one port, the Interface Logic ID circuit can be permanently programmed with the identification of which data interface circuit is to be activated by the controller circuit. For example, the value stored in the Interface Logic ID circuit can be established by creating a pattern of open or closed circuits within the Logic ID circuit during the manufacture of the apparatus.

Additional preferred embodiments and implementation features are discussed in the following U.S. patent applications, each of which is hereby incorporated by reference in its entirety into the present patent specification:

Ser. No. 60/921,508 filed Jan. 1, 2007 (SDD-1089x), entitled "Decoupling with Two Types of Capacitors";

Ser. No. 60/934,937 filed Jan. 1, 2007 (SDD-1089y), entitled "Chip with Two Types of Decoupling Capacitors";

Ser. No. 60/934,923 filed 31 Dec. 2006 (SDA-1090-X-US), entitled "Internally Protecting Lines at Power Island Boundaries";

Ser. No. 60/999,760 filed 31 Dec. 2006 (SDD-1090y), entitled "Integrated Circuit with Protected Internal Isolation";

Ser. No. 60/934,917 filed 31 Dec. 2006 (SDA-1091x), entitled "Updating Delay Trim Values";

Ser. No. 60/634,918 filed 31 Dec. 2006 (SDA-1091y), entitled "Module with Delay Trim Value Updates on Power-Up";

Ser. No. 60/921,507 filed 31 Dec. 2006 (SDA-1092x), entitled "Limiting Power Island Inrush Current";

Ser. No. 60/634,936 filed 31 Dec. 2006 (SDA-1092P-Y-US), entitled "Systems and Integrated Circuits with Inrush-Limited Power Islands";

Ser. No. 11/618,865 filed 31 Dec. 2006 (SDA-1094x), entitled "Method for Performing Full Transfer Automation in a USB Controller";

Ser. No. 11/618,867 filed 31 Dec. 2006 (SDA-1094y), entitled "USB Controller with Full Transfer Automation";

Ser. No. 11/618,849 filed 31 Dec. 2006 (SDA-1095x), entitled "Method for Configuring a USB PHY to Loopback Mode";

Ser. No. 11/618,852 filed 31 Dec. 2006 (SDA-1095y), entitled "Apparatus for Configuring a USB PHY to Loopback Mode";

The invention claimed is:

1. An apparatus including a plurality of separately powered electrical circuits, comprising:
a plurality of electrical circuits, wherein each electrical circuit includes one or more power inputs;
a plurality of power switch circuits, wherein each power switch circuit includes a control input and includes a power output connected to a distinct one of the power inputs of the electrical circuits;
one or more isolator circuits, each isolator circuit including a control input, a data input, and a data output; and
a controller circuit;
wherein the controller circuit is configured to send an enable signal to the control input of each of the power switch circuits whose power output is connected to a selected one of the electrical circuits;
wherein the controller circuit is configured to send a disable signal to the control input of each of the other power switch circuits;
wherein a first one of the electrical circuits includes one or more data inputs respectively connected to the data output of a respective one of the isolator circuits; and
wherein the controller circuit is configured to send an isolator enable signal to the control input of each of the isolator circuits while it sends said enable signal to each of the plurality of power switch circuits connected to said one electrical circuit and to send an isolator disable signal to the control input of each of the isolator circuits while it sends said disable signal to each of the plurality of power switch circuits connected to said one electrical circuit.

2. The apparatus of claim 1, further comprising:
one or more power sources;
wherein each of the plurality of power switch circuits further comprises a power input configured to receive power from one of the power sources; and
wherein each of the plurality of power switch circuits enables or disables a flow of electrical power from its power input to its power output in response to whether its control input receives said enable signal or said disable signal, respectively.

3. The apparatus of claim 1, wherein:
the apparatus is configured to receive electrical power from a host electrical device external to the apparatus; and
after the controller circuit sends said enable signal, the controller circuit continues sending said enable signal to the control input of each of the power switch circuits whose power output is connected to said selected one of the electrical circuits, and continues sending said disable signal to the control input of each of the other power switch circuits, as long as the apparatus receives electrical power from the host electrical device without interruption.

4. The apparatus of claim 3, wherein:
the controller circuit sends said enable signal in response to the apparatus receiving power from said host electrical device.

5. The apparatus of claim 1, wherein each electrical circuit is a data interface circuit configured to communicate data in accordance with a distinct data interface protocol.

6. The apparatus of claim 1, further comprising:
one or more interface ports;
wherein each electrical circuit is a data interface circuit; and
wherein each interface port is configured to communicate data with one of the data interface circuits.

7. The apparatus of claim 6, further comprising:
a non-volatile memory; and
a memory controller connected between the non-volatile memory and at least one of the data interface circuits.

8. The apparatus of claim 1, wherein:
each isolator circuit, in response to receiving said isolator enable signal, couples its data input to its data output; and
each isolator circuit, in response to receiving said isolator disable signal, disconnects its data input from its data output and sets its data output to zero volts.

9. An apparatus including a plurality of separately powered electrical circuits, comprising:
a plurality of electrical circuits, wherein each electrical circuit includes one or more power inputs;
a plurality of power switch circuits, wherein each power switch circuit includes a control input and includes a power output connected to a distinct one of the power inputs of the electrical circuits;

one or more isolator circuits, the one or more isolator circuits each including an isolator control input, a data input, and a data output; and a controller circuit characterized by a plurality of states of operation that include a plurality of activation states, wherein each respective activation state corresponds to a distinct respective one of said electrical circuits;

wherein the controller circuit, when operating in at least one of the activation states, is configured to send at least one signal to at least one of the control inputs so that each of the one or more power switch circuits whose power output is connected to the electrical circuit corresponding to said activation state is enabled and each of the other one or more power switch circuits is disabled;

wherein the controller circuit, when operating in the at least one of the activation states, is configured to send at least one isolator signal so that at least one isolator circuit associated with the enabled one or more power switch circuits is enabled and so that at least one isolator circuit associated with the disabled one or more power switch circuits is disabled.

10. The apparatus of claim 9, wherein the states of operation of the controller circuit further include a state in which the controller circuit sends an enable signal to a plurality of power switch circuits connected to a plurality of said electrical circuits.

11. The apparatus of claim 9, wherein the states of operation of the controller circuit further include an off state in which the controller circuit sends a disable signal to all of the power switch circuits.

12. The apparatus of claim 9, further comprising:
one or more power sources;
wherein each of the plurality of power switch circuits further comprises a power input configured to receive power from the one of the power sources; and
wherein each of the plurality of power switch circuits enables or disables a flow of electrical power from its power input to its power output in response to whether its control input receives an enable signal or a disable signal, respectively.

13. The apparatus of claim 9, wherein:
the apparatus is configured to receive electrical power from a host electrical device external to the apparatus; and
after the controller circuit begins operating in one of said activation states, the controller circuit continues operating in said one activation state as long as the apparatus receives electrical power from said host electrical device without interruption.

14. The apparatus of claim 13, wherein:
the controller circuit enters said one activation state in response to the apparatus receiving power from said host electrical device.

15. The apparatus of claim 9, wherein each electrical circuit is a data interface circuit configured to communicate data in accordance with a distinct data interface protocol.

16. The apparatus of claim 9, further comprising:
one or more interface ports;
wherein each electrical circuit is a data interface circuit; and
wherein each interface port is configured to communicate data with one of the data interface circuits.

17. The apparatus of claim 9, wherein:
each isolator circuit, in response to receiving an isolator enable signal, couples its data input to its data output; and each isolator circuit, in response to receiving an isolator disable signal, disconnects its data input from its data output and sets its data output to zero volts.

18. The apparatus of claim 9, wherein:
the controller circuit further comprises an ID logic circuit that stores an ID value that identifies which one of the activation states currently is selected by the ID logic circuit; and
the controller circuit reads the value stored in the ID logic circuit and then, in response to said ID value, operates in the activation state identified by said ID value.

19. The apparatus of claim 18, wherein the ID logic circuit comprises a pattern of open or closed circuits permanently established in the apparatus, wherein said pattern represents the ID value.

20. The apparatus of claim 18, wherein the ID logic circuit comprises one or more flip-flops characterized by a state, and wherein the respective states of the flip-flops collectively represent the ID value.

21. An apparatus configured to communicate with a host electrical device external to the apparatus, comprising:
a plurality of host interface circuits, wherein each host interface circuit includes one or more power inputs;
a plurality of power switch circuits, wherein each power switch circuit includes:
(i) a control input;
(ii) a power input configured to receive power from a host electrical device external to the apparatus, and
(iii) a power output connected to a distinct one of the power inputs of the host interface circuits;
one or more isolator circuits, wherein each isolator circuit includes:
(i) an isolator control input;
(ii) a data input; and
(iii) a data output; and
a controller circuit that is configured to:
send an enable signal to the control input of each of the power switch circuits whose power output is connected to a selected one of the host interface circuits;
send a disable signal to the control input of each of the other power switch circuits;
send an isolator enable signal to the control input of each of the isolator circuits while it sends said enable signal to each of the plurality of power switch circuits connected to said one electrical circuit; and
send an isolator disable signal to the control input of each of the isolator circuits while it sends said disable signal to each of the plurality of power switch circuits connected to said one electrical circuit.

22. The apparatus of claim 21, further comprising:
an interface port configured to be connected to a power output of a host electrical device external to the apparatus;
wherein the interface port is connected to the power input of one of the power switch circuits.

23. The apparatus of claim 21, further comprising:
an interface port configured to be connected to a power output of a host electrical device external to the apparatus; and
a voltage regulator connected between the interface port and the power input of one of the power switch circuits.

24. The apparatus of claim 21, further comprising:
a plurality of interface ports, wherein each interface port is configured to connect to a host electrical device external to the apparatus;
wherein each interface port is configured to communicate data with one of the host interface circuits.

25. The apparatus of claim 21, wherein:
after the controller circuit sends said enable signal, the controller circuit is configured to continue sending said enable signal to the control input of each of the power switch circuits whose power output is connected to said selected one of the host interface circuits, and is configured to continue sending said disable signal to the control input of each of the other power switch circuits, as long as the apparatus receives electrical power from a host electrical device without interruption.

26. The apparatus of claim 25, wherein:
the controller circuit is configured to send said enable signal in response to the apparatus receiving power from said host electrical device.

27. A non-volatile memory peripheral device, comprising:
a plurality of host interface circuits, wherein each host interface circuit includes one or more power inputs;
a plurality of power switch circuits, wherein each power switch circuit includes:
(i) a control input;
(ii) a power input configured to receive power from a host electrical device external to the apparatus, and
(iii) a power output connected to a distinct one of the power inputs of the host interface circuits;
one or more isolator circuits, wherein each isolator circuit includes:
(i) an isolator control input;
(ii) a data input; and
(iii) a data output;
a controller circuit configured to send an enable signal to the control input of each of the power switch circuits whose power output is connected to a selected one of the host interface circuits, configured to send a disable signal to the control input of each of the other power switch circuits, configured to send an isolator enable signal to the control input of each of the isolator circuits at least partly while it sends said enable signal, and configured to send an isolator disable signal to the control input of each of the isolator circuits at least partly while it sends said disable signal;
a non-volatile memory; and
a memory controller connected between the non-volatile memory and at least one of the host interface circuits.

28. The non-volatile memory peripheral device of claim 27, further comprising:
a plurality of interface ports, wherein each interface port is configured to connect to a host electrical device external to the apparatus;
wherein each interface port is configured to communicate data with one of the host interface circuits.

29. The non-volatile memory peripheral device of claim 27, wherein each host interface circuit is configured to communicate data in accordance with a distinct data interface protocol.

30. The non-volatile memory peripheral device of claim 27, wherein:
after the controller circuit sends said enable signal, the controller circuit is configured to continue sending said enable signal to the control input of each of the power switch circuits whose power output is connected to said selected one of the host interface circuits, and is configured to continue sending said disable signal to the control input of each of the other power switch circuits, as long as the apparatus receives electrical power from a host electrical device without interruption.

31. The non-volatile memory peripheral device of claim 30, wherein:
the controller circuit is configured to send said enable signal in response to the apparatus receiving power from said host electrical device.

32. An apparatus providing isolation between first and second electrical circuits, comprising:
first and second circuits, wherein the first circuit includes a number of data inputs, and wherein the second circuit includes said number of data outputs;
said number of isolator circuits, wherein each respective isolator circuit includes a control input, a data output connected to a respective data input of the first circuit, and a data input connected to a respective data output of the second circuit; and
a power switch circuit having a control input and a power output;
wherein each isolator circuit, in response to receiving an enable signal at its control input, is configured to couple its data input to its data output;
wherein each isolator circuit, in response to receiving a disable signal at its control input, is configured to disconnect its data input from its data output and sets its data output to zero volts;
wherein the first electrical circuit includes a power input connected to the power output of the power switch circuit; and
wherein the power switch circuit, in response to a signal received at its control input, is configured to selectably enable and disable a supply of electrical power to the power input of the first electrical circuit.

33. The apparatus of claim 32, further comprising:
a controller circuit;
wherein the controller is configured to selectably either send an enable signal to the control input of the power switch circuit and to the control input of each of the isolator circuits, or else send a disable signal to the control input of the power switch circuit and to the control input of each of the isolator circuits.

34. A method of receiving electrical power from, and transferring data with, a host electrical device external to an apparatus, the apparatus comprising: a plurality of electrical circuits, wherein each electrical circuit includes one or more power inputs; a plurality of power switch circuits, wherein each power switch circuit includes a control input and includes a power output connected to a distinct one of the power inputs of the electrical circuits; one or more isolator circuits, the one or more isolator circuits each including an isolator control input, a data input, and a data output; and a controller, the method comprising:
receiving electrical power from the host electrical device;
sending the electrical power to at least one of the plurality of power switch circuits;
sending, by the controller, at least one signal to at least one of the control inputs so that each of the one or more power switch circuits, whose power output comprises at least a part of the electrical power and is connected to at least one of the electrical circuits, is enabled and each of the other one or more power switch circuits is disabled; and
sending, by the controller, at least one isolator signal so that at least one isolator circuit associated with the enabled one or more power switch circuits is enabled and so that at least one isolator circuit associated with the disabled one or more power switch circuits is disabled.

35. The method of claim 34, wherein the controller sends an enable signal to the control input of each of the power switch circuits whose power output is connected to the selected one of the electrical circuits; and
    wherein the controller sends a disable signal to the control input of each of the other power switch circuits.

36. The method of claim 34, wherein each of the plurality of power switch circuits further comprises a power input configured to receive at least a part of the received electrical power; and
    further comprising:
        each power switch circuit enabling or disabling a flow of the at least a part of the received electrical power from its power input to its power output in response to whether its control input receives an enable signal or a disable signal, respectively; and
        selectively enabling or disabling a supply of the at least a part of the received electrical power from its power input to its power output in response to whether the power control signal received at its power control input has the enable value or the disable value.

37. The method of claim 34, wherein sending at least one isolator signal comprises:
    sending, by the controller, an isolator enable signal to the control input of each of the one or more isolator circuits associated with the enabled power switch circuit while the controller sends an enable signal to each of the plurality of power switch circuits connected to the one electrical circuit; and
    sending, by the controller, an isolator disable signal to the control input of each of the one or more isolator circuits associated with the disabled power switch circuit while the controller sends a disable signal to each of the plurality of power switch circuits connected to the one electrical circuit.

38. The apparatus of claim 9, further comprising a plurality of interface ports, the interface ports configured to physically connect to another device; and
    wherein at least some of the isolator circuits are connected between a respective power switch circuit and a respective interface port.

39. The apparatus of claim 38, wherein other isolator circuits are connected between a respective power switch circuit and the controller.

40. The apparatus of claim 9, wherein the plurality of electrical circuits each include at least one input; and
    wherein at least some of the isolator circuits are configured to output a zero voltage signal to a respective at least one input in response to receipt of an isolator disable control signal.

41. The apparatus of claim 40, wherein the at least one input includes a clock input and a data input; and
    wherein the at least some of the isolator circuits are configured to output a zero voltage signal to a respective clock input and a respective data input in response to the isolator disable control signal.

42. The apparatus of claim 9, wherein the plurality of electrical circuits each include at least one input and at least one output; and
    wherein at least some of the isolator circuits are configured to latch, in response to receipt of an isolator disable control signal, a last value of the at least one input prior to receipt of the isolator disable control signal.

43. The apparatus of claim 9, wherein the plurality of electrical circuits each include at least one input and at least one output; and
    wherein at least some of the isolator circuits are configured to selectively output a logic zero or a logic one.

44. The apparatus of claim 9, wherein the plurality of electrical circuits each are fabricated in a separate power island.

45. The apparatus of claim 9, wherein one of the plurality of electrical circuits comprises an interface circuit for a secure digital protocol; and
    wherein another of the plurality of electrical circuits comprises an interface circuit for a memory stick protocol.

46. The apparatus of claim 9, wherein the controller circuit is configured to control the one or more power switch circuits in order to power multiple of the plurality of electrical circuits.

47. The method of claim 34, wherein the plurality of electrical circuits each include at least one input; and
    further comprising outputting, by at least some of the isolator circuits, a zero voltage signal to a respective at least one input in response to receipt of an isolator disable control signal.

48. The method of claim 47, wherein the at least one input includes a clock input and a data input; and
    wherein outputting comprising outputting, by the at least some of the isolator circuits, the zero voltage signal to a respective clock input and a respective data input in response to receipt of the isolator disable control signal.

49. The method of claim 34, wherein the plurality of electrical circuits each include at least one input and at least one output; and
    further comprising, in response to receipt of an isolator disable control signal, latching a last value of the at least one input prior to receipt of the isolator disable control signal.

50. The method of claim 34, wherein the plurality of electrical circuits each include at least one input and at least one output; and
    further comprising, in response to receipt of an isolator disable control signal, selectively outputting by the one or more isolator circuits a logic zero or a logic one.

* * * * *